United States Patent [19]
Strong et al.

[11] Patent Number: 4,799,513
[45] Date of Patent: Jan. 24, 1989

[54] MULTI-PORT VALVE

[75] Inventors: Michael R. Strong, Midland; James C. Sell, Jr., Saginaw; David J. Cimbalik, Midland, all of Mich.

[73] Assignee: Dow Corning Corporation, Midland, Mich.

[21] Appl. No.: 152,511

[22] Filed: Feb. 5, 1988

[51] Int. Cl.[4] ............................................. F16K 11/04
[52] U.S. Cl. ................................. 137/625.48; 137/872
[58] Field of Search ............... 137/625.48, 872, 869; 251/63

[56] References Cited

U.S. PATENT DOCUMENTS

| | | | |
|---|---|---|---|
| 2,054,640 | 9/1936 | Stenger | 251/63 |
| 2,638,927 | 5/1953 | Walker | 251/63 X |
| 3,583,441 | 6/1971 | Grant | 137/625.48 |
| 3,680,595 | 8/1972 | Boulton | 137/625.48 |
| 4,464,340 | 8/1984 | Lennox | 251/63 X |

Primary Examiner—Alan Cohan
Attorney, Agent, or Firm—Allan O. Maki

[57] ABSTRACT

A valve comprising a cylinder with a number of inlet and outlet ports at one end having movable therein a resiliently surfaced piston, wherein the valve is closed by movement of the piston to a position wherein the resilient surface simultaneously closes all of the ports. Means is provided to normally urge the valve toward an open position and closing means which may be highly pressurized air is provided to move the piston to a valve closed position.

6 Claims, 1 Drawing Sheet

FIG. 1
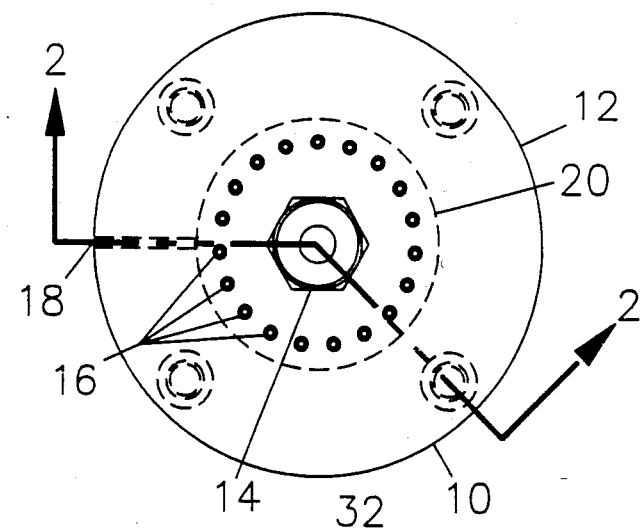
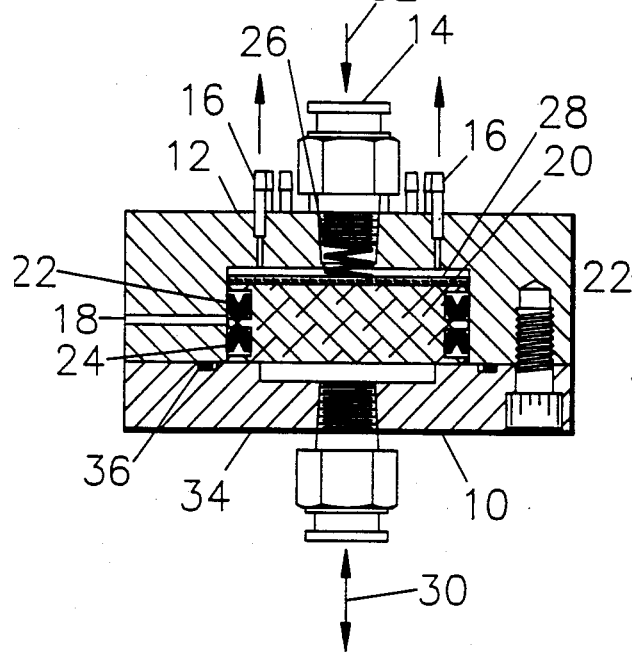
FIG. 2
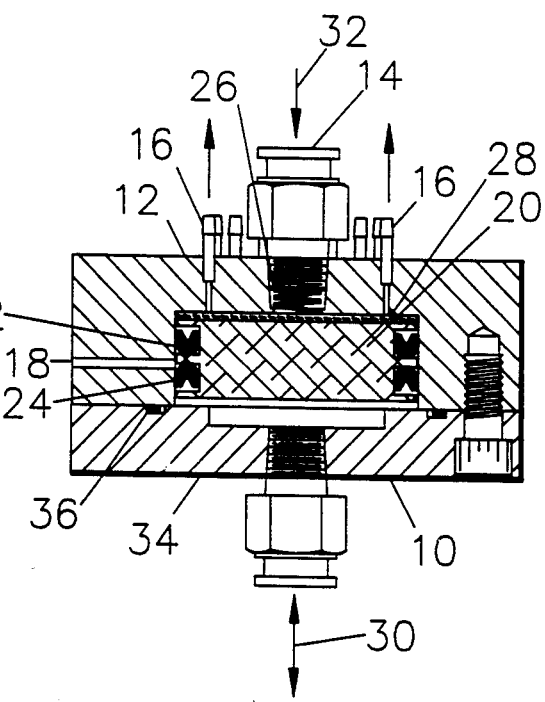
FIG. 3

MULTI-PORT VALVE

This invention relates to a valve, particularly of the type capable of distributing pressurized gas or fluids from a single inlet port simultaneously to a multiplicity of outlet ports

BACKGROUND OF THE INVENTION

Various valve arrangements have been hithertofore devised to distribute gases from an inlet port to two or more outlet ports. For example, U.S. Pat. No. 2,664,910 to Boyd et al teaches the use of a flow distributor valve for distribution of fuel in a gas turbine engine. The valve used in said device employs a piston movable within a cylinder to cause opening and closing of the valve. Said valve does not, however, utilize an resilient surface to simultaneously tightly seal off the ports.

Another type of valve is disclosed in USSR Pat. No. 761752, which discloses a form of relief valve. Said valve is capable of opening when the pressure inside a closed system exceeds a predetermined amount. The valve shown therein utilizes a piston, provided with resilient means, movable within a cylinder, to close the valve, but said piston is not sealed around its periphery nor is it provided with any means normally urging the valve into an open position nor any controllable way to close the valve when desired, except upon lowering of the pressure within the closed system.

There has remained, a need for a valve capable of simultaneously closing a multiplicity of ports rapidly and tightly enough to assure the absence of any leakage through the valve. The principle object of the present invention is to provide a valve which fills said need.

SUMMARY OF THE INVENTION

The invention, broadly summarized, includes a valve having a stationary exterior structure enclosing a cavity, preferably a cylinder; a movable means, preferably a piston, located within said cavity, movable from a valve open position to a valve closed position and forming a chamber within said cavity; a plurality of outlet ports and at least one inlet port extending through a surface of said exterior structure, preferably through the end wall of said cylinder; a resilient surface on said movable means adapted to close said ports when said movable means travels to the closed position; seal means to prevent flow of fluid from said chamber to the remainder of said cavity; means, preferably a spring, urging said movable element toward a valve open position; and, means for moving said movable means to a valve closed position. The latter means may be highly pressurized air hydraulic fluid or equivalent means. The resilient means is preferably an elastomeric layer covering the end of said piston and permitting closing simultaneously all of the ports so that the valve can be closed in a highly leak-proof fashion.

Specifically the valve of this invention is adapted to be used in conjunction with a device for detecting leaks in electrical connectors, particularly where the leaks being checked for are of an extremely small nature, for example, equal to or smaller in diameter than a human hair. Such detection system is the subject of a copending application filed simultaneously herewith. The valve of this invention is capable of sealing simultaneously a plurality of openings to a sufficiently leak-proof state to permit detection of the rate of decay of pressure within such connector sockets. Valves previously known to applicants would tend to leak more themselves than would the leaks being checked for, thus rendering the use of such test devices unfeasible.

DRAWINGS

The invention will be further explained in the following detailed description and drawings wherein:

FIG. 1 is an end view of a valve of this invention showing the inlet and outlet ports, FIG. 2 is a cross-sectional view of the valve, in the open position, taken along Line 2—2 of FIG. 1, and, FIG. 3 is a cross-sectional view of the valve in the closed position, also taken along Line 2—2.

DETAILED DESCRIPTION

The valve is indicated generally in the drawings by numeral 10. Valve 10 includes an outer cylinder portion 12, access to the interior of which is provided by an inlet port 14 and a multiplicity of outlet ports 16. In FIG. 1 a embodiment provided with 19 of such ports is shown for purposes of illustration, but it will be readily apparent that various numbers, one or more, can be used depending on the specific use to which the valve is to be put.

Located within cylinder 12 is a piston 20 fitted for reciprocating movement therewithin. Suitable seals such as "O" rings 22 and 24 are provided on piston 20 to assure a relatively air tight fit between the cylinder 12 and piston 20. A resilient means such as spring 26 is provided to urge piston 20 toward a valve open position. As seen in FIG. 3, spring 26 is compressed when the valve is closed. A resilient, preferably elastomeric or rubbery surface 28 is provided on the surface of piston 20 which adjoins the series of ports 14, 16. Thus when piston 20 travels to the top as seen in FIG. 3, all of the ports 14, 16 are simultaneously and very tightly closed. Surface 28 can be formed from any rubbery, preferably cross-linked elastomer, various types of which are well known to those skilled in the art. Silicone elastomers have been found suitable, but various cross-linked organic polymers may be substituted. Other substitute materials include leathers or similar tough resilient materials.

Various mechanical or hydraulic means may be employed to move the piston 20 to the closed position. However, it is preferred that the closing force be supplied by a source of air or similar fluid pressure 30 which is of a substantially higher pressure than that of supply 32 which transmits pressurized air or other fluid to inlet port 14. Air pressure supply 30 can be turned on and off by means of a solenoid (not shown) or similarly actuated valve means. It has been found desirable to provide an air pressure relief outlet 18 between the "O" rings so as to avoid any build up of pressure which could interfere with the operation of the valve. "O" ring 36 is also provided to seal end plate 34 to the body of cylinder 12.

In operation it will be apparent that when piston 20 is down, in the open position, as shown in FIG. 2, that fluid 32 is distributed through valve 10 to each of outlet ports 16. Each port is closed simultaneously when the piston 20 travels up to the position shown in FIG. 3. It will thus be apparent that the valve of this invention can be used in a myriad of applications wherein it is desired to provide an interruptible supply of fluids from one or more inlet ports to a number of outlet ports particularly where it is important to be able to close said ports tightly and/or simultaneously. It will further be apparent that the valve is of a type which can be employed wherever there is a need for such capability.

It will be apparent to those skilled in the art that the configuration or shape of the cylinder and piston as well as the particular surface of the cylinder on which the inlet and outlet ports are located can be altered without departing from the spirit of the invention.

It will also be apparent that a novel rapidly acting valve is provided which can be employed wherever there is a need to supply a supply of fluid from one or more inlet ports to any desired number of outlet ports. This valve is of particular utility in any situation where it is desirable to close all ports simultaneously and very tightly.

It is to be understood that the foregoing embodiments are to be considered illustrative of the invention. Various modifications, changes or alterations of the invention disclosed herein may be evident to those skilled in the art and thus the invention disclosed herein is not intended to be limited by the description hereinabove but rather, is intended to be limited only by the appended claims.

That which is claimed is:

1. A valve capable of rapidly simultaneously closing a multiplicity of ports tightly enough to assure the absence of any leakage through the valve comprising a stationary exterior structure enclosing a cavity, a movable means located within said cavity, movable from a valve open position to a valve closed position and forming a chamber within said cavity, a plurality of outlet ports and at least one inlet port extending through a surface of said exterior structure, a resilient surface on said movable means adapted to tightly close said ports when said movable means travels to the closed position, seal means to prevent flow of fluid from said chamber to the remainder of said cavity, means urging said movable element toward a valve open position, means comprising a fluid under high pressure for moving said movable means to a valve closed position, and, means for turning off the supply of said high pressure to return said valve to the open position.

2. A valve according to claim 1 wherein said cavity is in the shape of a hollow cylinder.

3. A valve according to claim 2 wherein said movable means is in the shape of a piston of cylindrical cross-section fitted within said hollow cylinder.

4. A valve according to claim 3 wherein said resilient means is an elastomeric layer covering the end of said piston.

5. A valve according to claim 4 wherein said ports are located in the end of said cylinder.

6. A valve according to claim 1 wherein said means for turning on and off the supply of fluid under high pressure comprises solenoid.

* * * * *